(12) United States Patent
Luo et al.

(10) Patent No.: US 11,551,045 B2
(45) Date of Patent: Jan. 10, 2023

(54) ARTIFICIAL INTELLIGENCE BASED METHOD AND APPARATUS FOR PROCESSING INFORMATION

(71) Applicant: Beijing Baidu Netcom Science and Technology Co., Ltd., Beijing (CN)

(72) Inventors: Jinwen Luo, Beijing (CN); Weidong Guo, Beijing (CN); Yile Chen, Beijing (CN); Jianfeng Chi, Beijing (CN); Yajuan Lv, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 1329 days.

(21) Appl. No.: 15/933,555

(22) Filed: Mar. 23, 2018

(65) Prior Publication Data
US 2018/0365534 A1 Dec. 20, 2018

(30) Foreign Application Priority Data
Jun. 20, 2017 (CN) .......................... 201710470407.4

(51) Int. Cl.
*G06K 9/62* (2022.01)
*G06F 11/34* (2006.01)
(Continued)

(52) U.S. Cl.
CPC ........ *G06K 9/6292* (2013.01); *G06F 11/3438* (2013.01); *G06K 9/6254* (2013.01);
(Continued)

(58) Field of Classification Search
CPC .. G06K 9/6292; G06K 9/6254; G06K 9/6262; G06K 9/6268; G06F 11/3438;
(Continued)

(56) References Cited

U.S. PATENT DOCUMENTS

| 11,100,405 B1* | 8/2021 | Yao .................... G06Q 30/0204 |
| 2017/0186030 A1* | 6/2017 | Jiang ...................... G06N 20/00 |

FOREIGN PATENT DOCUMENTS

CN 106126640 B * 1/2019 ........... G06F 16/951

OTHER PUBLICATIONS

Pekhimenko, G., Lymberopoulos, D., Riva, O., Strauss, K. and Burger, D., May 2015. Pockettrend: Timely identification and delivery of trending search content to mobile users. In Proceedings of the 24th International Conference on World Wide Web (pp. 842-852).*

* cited by examiner

*Primary Examiner* — Zhitong Chen
(74) *Attorney, Agent, or Firm* — Nixon Peabody LLP (57) ABSTRACT

An artificial intelligence based method and apparatus for processing information. A specific embodiment of the method includes: acquiring search click information recorded within a predetermined time period; generating a candidate entry set by selecting, from the search click information, entries having click volumes exceeding a click volume threshold within a preset unit time period; forming, for each candidate entry in the candidate entry set, a click volume sequence according to a chronological order of each of the click volumes corresponding to the candidate entry in the predetermined time period; determining, based on click volume sequences, categories of the candidate entries respectively corresponding to click volume sequences; and determining candidate entries having the categories being a preset category as points of interest to generate a set of points of interest.

17 Claims, 6 Drawing Sheets

(51) Int. Cl.
 *G06N 5/04* (2006.01)
 *G06V 10/46* (2022.01)
 *G06V 10/75* (2022.01)

(52) U.S. Cl.
 CPC ......... *G06K 9/6262* (2013.01); *G06K 9/6268* (2013.01); *G06N 5/04* (2013.01); *G06N 5/046* (2013.01); *G06V 10/464* (2022.01); *G06V 10/757* (2022.01)

(58) Field of Classification Search
 CPC ........ G06F 16/951; G06N 5/04; G06N 5/046; G06N 5/003; G06V 10/464; G06V 10/757
 See application file for complete search history.

ARTIFICIAL INTELLIGENCE BASED METHOD AND APPARATUS FOR PROCESSING INFORMATION

CROSS-REFERENCE TO RELATED APPLICATIONS

This application is related to and claims priority from Chinese patent application no. 201710470407.4, filed with the state intellectual property office (SIPO) of the People's Republic of China on Jun. 20, 2017, the entire disclosure of the Chinese patent application is hereby incorporated by reference.

TECHNICAL FIELD

The present disclosure relates to the field of computer technology, specifically to the field of Internet technology, and more specifically to an artificial intelligence based method and apparatus for processing information.

BACKGROUND

Artificial Intelligence (AI) is a new technological science which researches on and develops theories, methods, techniques and application systems for simulating, extending and expanding human intelligence. As a branch of the computer science, artificial intelligence attempts to learn about the principle of intelligence and produce a novel intelligent machine capable of responding in a way similar to human intelligence. The researches in this field include robot, language recognition, image recognition, natural language processing and expert systems, etc.

With the rapid development of the Internet and new media today, interests of the Internet users are constantly changing. There is a need to find the point which is of interest to the user at the present time based on the user group behavior, and the point may be referred to as the timely point of interest. For example, news events such as "an earthquake happened in the country XX," or recent popular news entertainment figures such as "Chen**," "Liu ##," or recent hot movies, entertainment proper nouns, all have been more popular relative to common points of interest at a certain moment. Applying the time-sensitive point of interest to a scenario such as an information push, can improve the user experience and increase the users' adherence. Therefore, how to excavate the timely point of interest is a problem worth studying.

SUMMARY

The objective of the present disclosure is to provide an improved artificial intelligence based method and apparatus for processing information, in order to solve the technical problem mentioned in the foregoing Background section.

In a first aspect, the present disclosure provides an artificial intelligence based method for processing information, the method including: acquiring search click information recorded within a predetermined time period, the search click information including entries searched in a unit time period contained in the predetermined time period and click volumes of the entries in the unit time period; generating a candidate entry set by selecting, from the search click information, entries having click volumes exceeding a click volume threshold within a preset unit time period; forming, for each candidate entry in the candidate entry set, a click volume sequence according to a chronological order of each of the click volumes corresponding to the candidate entry in the predetermined time period; determining, based on click volume sequences, categories of the candidate entries respectively corresponding to click volume sequences, the categories being used to characterize degrees to which the candidate entries are of interest to a user within the predetermined time period; and determining candidate entries having the categories being a preset category as points of interest to generate a set of points of interest.

In some embodiments, the determining, based on click volume sequences, categories of the candidate entries respectively corresponding to click volume sequences includes: segmenting, for each of the click volume sequences, the click volume sequence into a plurality of subsequences, based on a changing trend of the values of the components in the click volume sequence over time; generating trend description information for each subsequence in the plurality of subsequences; and inputting the plurality of subsequences and the trend description information respectively corresponding to the plurality of subsequences into a pre-trained classification model, in order to cause the classification model to predict a category of the candidate entry corresponding to the click volume sequence; wherein the classification model is configured to characterize a correspondence between first information and the category, the first information including the subsequences segmented from the click volume sequence and the trend description information respectively corresponding to the subsequences.

In some embodiments, the segmenting, for each of the click volume sequences, the click volume sequence into a plurality of subsequences, based on a changing trend of the values of the components in the click volume sequence over time includes: for any two adjacent components in the click volume sequence, if a target numerical value range including values of the adjacent components exists in a preset numerical value range set, and an absolute value of a difference between the values of the adjacent components is greater than a threshold corresponding to the target numerical value range, dividing the adjacent components into different subsequences, wherein each preset numerical value range in the preset numerical value range set has a corresponding threshold.

In some embodiments, the segmenting, for each of the click volume sequences, the click volume sequence into a plurality of subsequences, based on a changing trend of the values of the components in the click volume sequence over time includes: dividing the click volume sequence into click volume group sequences, based on the changing trend of the values of the components in the click volume sequence over time; determining an average value and a variance of the values of the components in each click volume group in the click volume group sequences; determining, a segmentation point in the each click volume group included in the click volume group sequence based on the determined average value and variance; and segmenting the click volume sequence from the determined segmentation points to obtain the plurality of subsequences corresponding to the click volume sequence.

In some embodiments, the dividing the click volume sequence into click volume group sequences, based on the changing trend of the values of the components in the click volume sequence over time includes: finding peak value points in the click volume sequence, and dividing the click volume sequence into the click volume group sequences based on the found peak value points, wherein the peak value points are the components having the values in the click volume sequence being greater or smaller than values of both neighboring adjacent components at the same time.

In some embodiments, the determining, a segmentation point in the each click volume group included in the click volume group sequence based on the determined average value and variance includes: for any two adjacent click volume groups in the click volume group sequence, if a first target preset numerical value range exists in a first preset numerical value range set, an average value corresponding to a rear click volume group in the adjacent click volume groups dividing an average value corresponding to a front click volume group and an obtained quotient is greater than a first preset value corresponding to the first target preset numerical value range, and a variance corresponding to the each click volume group in the adjacent click volume groups dividing the corresponding average value and an obtained quotient is greater than a second preset value corresponding to the first target preset numerical value range, determining a last component of the front click volume group as the segmentation point, wherein the first target preset numerical value range is a numerical value range including an absolute value of a difference between the average values respectively corresponding to the adjacent click volume groups, each first preset numerical value range in the first preset numerical value range set having a corresponding first preset value and a second preset value.

In some embodiments, the method further includes: calculating a similarity between any two points of interest in the set of points of interest, and combining points of interest having a similarity higher than a similarity threshold to generate a first set of points of interest.

In some embodiments, the calculating a similarity between any two points of interest in the set of points of interest includes: lexing each point of interest in the set of points of interest and calculating the similarity between any two points of interest in the set of points of interest based on the lexed words.

In some embodiments, the method further includes: removing a point of interest containing a keyword of a preset keyword set from the first set of points of interest to generate a second set of points of interest.

In a second aspect, the present disclosure provides an artificial intelligence based apparatus for processing information, the apparatus including: an acquisition unit, configured for acquiring search click information recorded within a predetermined time period, the search click information including entries searched in a unit time period contained in the predetermined time period and click volumes of the entries in the unit time period; a first generation unit, configured for generating a candidate entry set by selecting, from the search click information, entries having click volumes exceeding a click volume threshold within a preset unit time period; a formation unit, configured for forming, for each candidate entry in the candidate entry set, a click volume sequence according to a chronological order of each of the click volumes corresponding to the candidate entry in the predetermined time period; a determination unit, configured for determining, based on click volume sequences, categories of the candidate entries respectively corresponding to click volume sequences, the categories being used to characterize degrees to which the candidate entries are of interest to a user within the predetermined time period; and a second generation unit, configured for determining candidate entries having the categories being a preset category as points of interest to generate a set of points of interest.

In some embodiments, the determination unit includes: a segmentation subunit, configured for segmenting, for each of the click volume sequences, the click volume sequence into a plurality of subsequences, based on a changing trend of the values of the components in the click volume sequence over time; a generation subunit, configured for generating trend description information for each subsequence in the plurality of subsequences; and a prediction subunit, configured for inputting the plurality of subsequences and the trend description information respectively corresponding to the plurality of subsequences into a pre-trained classification model, in order to cause the classification model to predict a category of the candidate entry corresponding to the click volume sequence; wherein the classification model is configured to characterize a correspondence between first information and the category, the first information including the subsequences segmented from the click volume sequence and the trend description information respectively corresponding to the subsequences.

In some embodiments, the segmentation subunit includes: a processing module, configured for, for any two adjacent components in the click volume sequence, if a target numerical value range including values of the adjacent components exists in a preset numerical value range set, and an absolute value of a difference between the values of the adjacent components is greater than a threshold corresponding to the target numerical value range, dividing the adjacent components into different subsequences, wherein each preset numerical value range in the preset numerical value range set has a corresponding threshold.

In some embodiments, the segmentation subunit includes: a dividing module, configured for dividing the click volume sequence into click volume group sequences, based on the changing trend of the values of the components in the click volume sequence over time; a first determination module, configured for determining an average value and a variance of the values of the components in each click volume group in the click volume group sequences; a second determination module, configured for determining, a segmentation point in the each click volume group included in the click volume group sequence based on the determined average value and variance; and a segmentation module, configured for segmenting the click volume sequence from the determined segmentation points to obtain the plurality of subsequences corresponding to the click volume sequence.

In some embodiments, the dividing module includes: a dividing submodule, configured for finding peak value points in the click volume sequence, and dividing the click volume sequence into the click volume group sequences based on the found peak value points, wherein the peak value points are the components having the values in the click volume sequence being greater or smaller than values of both neighboring adjacent components at the same time.

In some embodiments, the second determination module includes: a determining submodule, configured for, for any two adjacent click volume groups in the click volume group sequence, if a first target preset numerical value range exists in a first preset numerical value range set, an average value corresponding to a rear click volume group in the adjacent click volume groups dividing an average value corresponding to a front click volume group and an obtained quotient is greater than a first preset value corresponding to the first target preset numerical value range, and a variance corresponding to the each click volume group in the adjacent click volume groups dividing the corresponding average value and an obtained quotient is greater than a second preset value corresponding to the first target preset numerical value range, determining a last component of the front click volume group as the segmentation point, wherein the first target preset numerical value range is a numerical value range including an absolute value of a difference between the average values respectively corresponding to the adjacent click volume groups, each first preset numerical value range in the first preset numerical value range set having a corresponding first preset value and a second preset value.

In some embodiments, the apparatus further includes: a third generation unit, configured for calculating a similarity between any two points of interest in the set of points of interest, and combining points of interest having a similarity higher than a similarity threshold to generate a first set of points of interest.

In some embodiments, the third generation unit includes: a calculation subunit, configured for lexing each point of interest in the set of points of interest and calculating the similarity between any two points of interest in the set of points of interest based on the lexed words.

In some embodiments, the apparatus further includes: a fourth generation unit, configured for removing a point of interest containing a keyword of a preset keyword set from the first set of points of interest to generate a second set of points of interest.

In a third aspect, embodiments of the present disclosure provides a server, the server including: one or more processors; a storage apparatus, to store one or more programs; and when the one or more programs being executed by the one or more processors, cause the one or more processors to implement the method as described in any of the implementations in the first aspect.

In a fourth aspect, the embodiments of the present disclosure provides a computer readable storage medium, storing a computer program thereon, the computer program, when executed by a processor, implements the method as described in any of the implementations in the first aspect.

By acquiring search click information recorded within a predetermined time period, to a candidate entry set by selecting, from the search click information, entries having click volumes exceeding a click volume threshold within a preset unit time period; then forming, for each candidate entry in the candidate entry set, a click volume sequence according to a chronological order of each of the click volumes corresponding to the candidate entry in the predetermined time period, to determine the categories being used to characterize degrees to which the candidate entries are of interest to a user within the predetermined time period; and finally determining candidate entries having the categories being a preset category as points of interest to generate a set of points of interest, the artificial intelligence based method and apparatus for processing information provided by the embodiments of the present disclosure thus effectively utilize the search click information recorded within the predetermined time period and achieves a targeted information processing.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
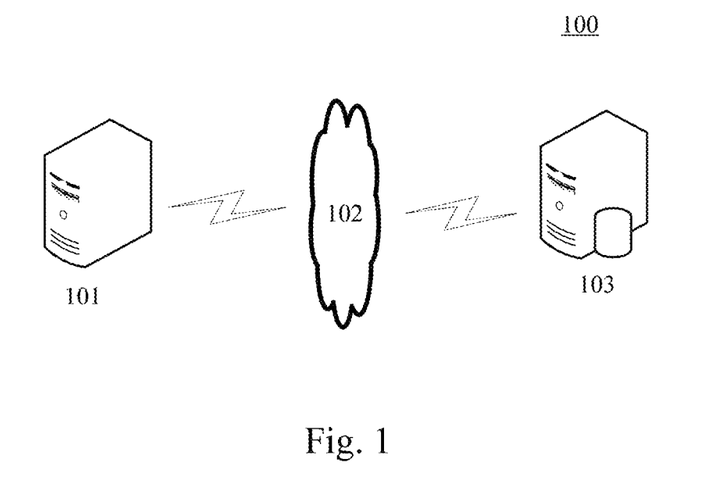
FIG. 1 is an exemplary system architecture diagram in which the present disclosure may be applied.

FIG. 1 shows an exemplary system architecture 100 in which the embodiments of the artificial intelligence based method for processing information or the artificial intelligence based apparatus for processing information of the present disclosure may be applied.

As shown in FIG. 1, the system architecture 100 may include an information processing server 101, a network 102, and a data storage server 103. The network 102 is a medium for providing a communication link between the information processing server 101 and the data storage server 103. The network 102 may include various types of connections, such as wired, wireless communication links or fiber-optic cables and the like.

The data storage server 103 may be a server that provides various services, such as storing search click information (including entries searched and click volumes of the entries within the unit time period) within a unit time period (for example, one day, half an hour) of a user.

The information processing server 101 may be a server that provides various services, such as periodically acquiring search click information recorded within a predetermined time period from the data storage server 103 and processing the search click information to obtain a processing result (for example, a generated set of points of interest).

It needs to be noted that the artificial intelligence based method for processing information provided by the embodiments of the present disclosure is generally executed by the information processing server 101, accordingly, the artificial intelligence based apparatus for processing information is generally provided in the information processing server 101.

It should be understood that the numbers of the information processing servers, the networks and the data storage servers in FIG. 1 are merely illustrative. Any number of information processing servers, networks and data storage servers may be provided based on the implementation requirements.

It needs to be noted that when the acquired search click information is prestored in the information processing server 101 locally, the data storage server 103 may not be included in the system architecture 100.

Figure 2:
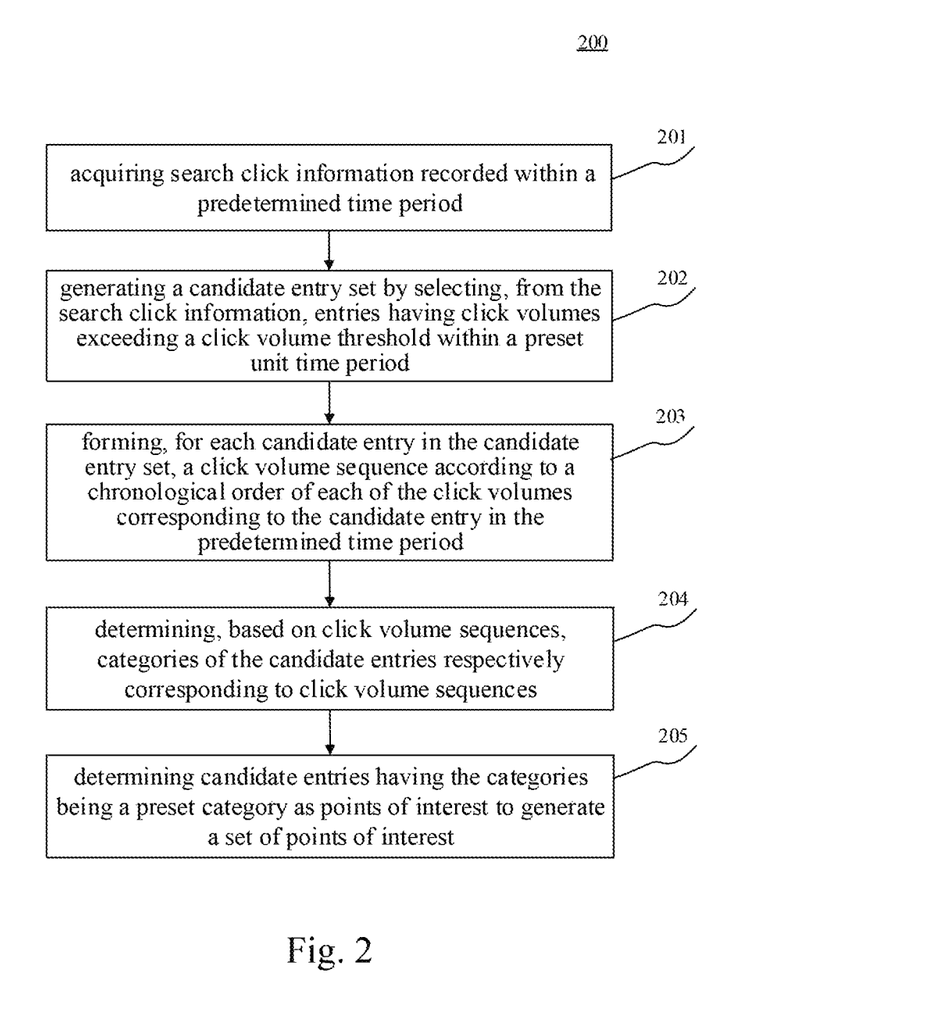
FIG. 2 is a flowchart of an embodiment of an artificial intelligence based method for processing information according to the present disclosure.

With further reference to FIG. 2, a flow 200 of an embodiment of the artificial intelligence based method for processing information according to the present disclosure is illustrated. The artificial intelligence based method for processing information includes the following steps:

Step 201, acquiring search click information recorded within a predetermined time period.

In the present embodiment, the electronic device (e.g., the information processing server 101 as shown in FIG. 1) on which the artificial intelligence based method for processing information runs may periodically (for example, every day, every half an hour, etc.) acquire search click information recorded within a predetermined time period. Here, the search click information may include entries searched in a unit time period contained in the predetermined time period and click volumes of the entries in the unit time period. Here, the entry may include a word, a term or a combination thereof. The headline of a news event, the name of a news entertainment figure, a movie entertainment proper noun, etc., may usually become an entry. It should be noted that, if the electronic device acquires the search click information in a day as the unit, the predetermined time period may not include the present day, and the predetermined time period may be, for example, the previous 30 days or the previous 20 days of the present day, and the like, and the length of the unit time period included by the predetermined time period may be one day. If the electronic device acquires the search click information in half an hour as the unit, the predetermined time period may not include the present time, and the predetermined time period may be, for example, the previous 12 hours or the previous 6 hours of the present time, and the like, and the length of the unit time period included by the predetermined time period may be half an hour.

In some alternative implementations of the present embodiment, the search click information acquired by the electronic device may be prestored locally in the electronic device or a server in remote communication with the electronic device (for example, the data storage server 103 as shown in FIG. 1).

Step 202, generating a candidate entry set by selecting, from the search click information, entries having click volumes exceeding a click volume threshold within a preset unit time period.

In the present embodiment, the electronic device may generate a candidate entry set by selecting, from the acquired search click information, entries having click volumes exceeding a click volume threshold within a preset unit time period. Here, the preset unit time period may be an ending unit time period within the predetermined time period. For example, if the unit time period included in the predetermined time period is sequentially May 6 to June 4, then June 4 may be the ending unit time period within the predetermined time period, and the preset unit time period may be June 4. If the unit time period included in the predetermined time period is sequentially: 00:00-00:29, 00:30-00:59, 01:00-01:29, . . . , 11:30-11:59, then 11:30-11:59 may be the ending unit time period within the predetermined time period, and the preset unit time period may be 11:30-11:59. Here, the click volume threshold may be manually set or may be automatically set by the electronic device. The click volume threshold may be modified according to actual needs, which is not limited in the present embodiment. It needs to be noted that the predetermined time periods of different lengths may correspond to different click volume thresholds.

Step 203, forming, for each candidate entry in the candidate entry set, a click volume sequence according to a chronological order of each of the click volumes corresponding to the candidate entry in the predetermined time period.

In the present embodiment, after generating the candidate entry set, the electronic device may form a click volume sequence according to a chronological order of each of the click volumes corresponding to each candidate entry in the candidate entry set (the click volume of the candidate entry in the unit time period included in the predetermined time period) in the predetermined time period. For example, it is assumed that each of the unit time periods included in the predetermined time period is sequentially: May 5, May 6, May 7, the entry "Zhou** Live Concert" has a click volume of 1000 on May 5, a click volume of 5000 on May 6, and a click volume of 4800 on May 5, the click volume sequence formed for the entry by the electronic device according to the chronological order may be, for example, [1000, 5000, 4800].

Step 204, determining, based on click volume sequences, categories of the candidate entries respectively corresponding to click volume sequences.

In the present embodiment, after forming the click volume sequence corresponding to each candidate entry in the candidate entry set, the electronic device may determine, based on the click volume sequences, categories of the candidate entries respectively corresponding to the click volume sequences. Here, the categories are used to characterize degrees to which the candidate entries are of interest to the user within the predetermined time period. The category may include, for example, hot, periodic, stable, losing heat. When the value of each component in the click volume sequence corresponding to a candidate entry presents an overall ascending trend over time (for example, for the click volume sequence [30, 50, 100, 68, 101], although 68 is smaller than 100, from the starting point to the ending point of the click volume sequence, there is an overall ascending trend), it may be characterized that the degree to which the candidate entry is of interest to the user also presents an ascending trend, then the category of the candidate entry may be, for example, hot. When the value of each component in the click volume sequence corresponding to a candidate entry presents a periodic trend, for example, ascends, descends, ascends, descends and so on over time (such as the click volume sequence [50, 100, 50, 100]), or descends, ascends, descends, ascends and so on (such as the click volume sequence [100, 50, 100, 50]), it may be characterized that the degree to which the candidate entry is of interest to the user also presents a periodic trend, then the category of the candidate entry may be periodic. When the absolute value of the difference between the values of any two components in the click volume sequence corresponding to a candidate entry is lower than an absolute value threshold, it may be characterized that the value of each component in the click volume sequence is close, the changing trend is relatively stable, and at the same time it may be characterized that the degree to which the candidate entry is of interest to the user is stable, then the category of the candidate entry may be, for example, stable. When the value of each component corresponding to a candidate entry presents an overall descending trend over time (for example, for the click volume sequence [1000, 1200, 900], although 1200 is larger than 1000, from the starting point to the ending point of the click volume sequence, there is an overall descending trend), it may be characterized that the degree to which the candidate entry is of interest to the user also presents a descending trend, then the category of the candidate entry may be, for example, losing heat. It needs to be noted that the naming of the category is not limited to the above hot, periodic, stable, losing heat, etc., the name of the category may be modified according to actual needs.

In some alternative implementations of the present embodiment, for each click volume sequence formed by the electronic device, the electronic device may segment the click volume sequence into a plurality of subsequences, based on a changing trend of the values of the components in the click volume sequence over time, and generate trend description information for each subsequence in the plurality of subsequences. The electronic device may input the plurality of subsequences and the trend description information respectively corresponding to the plurality of subsequences into a pre-trained classification model, in order to cause the classification model to predict a category of the candidate entry corresponding to the click volume sequence. Here, the classification model is configured to characterize a correspondence between first information and the category, and the first information may include the subsequences segmented from the click volume sequence and the trend description information respectively corresponding to the subsequences. For example, for any two adjacent components in the click volume sequence, if a target numerical value range including values of the adjacent components exists in a preset numerical value range set, and an absolute value of a difference between the values of the adjacent components is greater than a threshold corresponding to the target numerical value range, the electronic device may divide the adjacent components into different subsequences. Here, each preset numerical value range in the preset numerical value range set has a corresponding threshold. Here, the trend description information may include information for characterizing an ascending trend and information for characterizing a descending trend. The trend description information may be represented by a specific character, for example, "1" represents ascending, and "2" represents descending, which is not limited in the present embodiment. In addition, the threshold corresponding to each numerical value range in the preset numerical value range set and the preset numerical value range set may be manually set or may be automatically set by the electronic device, which is not limited in the present embodiment.

In some alternative implementations of the present embodiment, the electronic device may further segment each of the click volume sequences into a plurality of subsequences by performing the following steps: dividing the click volume sequence into click volume group sequences, based on the changing trend of the values of the components in the click volume sequence over time; determining an average value and a variance of the values of the components in each click volume group in the click volume group sequences; determining, a segmentation point in the each click volume group included in the click volume group sequence based on the determined average value and variance; and segmenting the click volume sequence from the determined segmentation points to obtain the plurality of subsequences corresponding to the click volume sequence. For example, for the click volume sequence [75, 85, 253, 273, 133, 167, 370], it is assumed that the component with an value of 85 is determined as the segmentation point, then the plurality of subsequences corresponding to the click volume sequence may be [75, 85] and [253, 273, 133, 167, 370]. Here, the electronic device may find peak value points in the click volume sequence, and divide the click volume sequence into the click volume group sequences based on the found peak value points, wherein the peak value points may be components having the values in the click volume sequence being greater or smaller than values of both neighboring adjacent components at the same time. For example, assuming that the click volume sequence is [25, 50, 32, 46], since 50 is greater than 25 and 32 simultaneously, and 32 is smaller than 50 and 46 simultaneously, the electronic device may divide the click volume sequence into a click volume group sequence, for example, {[25,50], [32], [46]}.

For any click volume group, the average value of the values of the components in the click volume group may be the ratio of the sum of the values of the components to the number of the components. The electronic device may calculate the variance of the values of the components by using the following formula:

$$s_N^2 = \frac{1}{N}\sum_{i=1}^{N}(x_i - \bar{x})^2$$

Here, N may represent the number of each component; i is a natural number and $1 \le i \le N$; $x_i$ represents the value of the $i^{th}$ component of the components; $\bar{x}$ represents the average value of the values of the components; and $s_N^2$ represents the variance of the values of the components.

It needs to be noted that for any two adjacent click volume groups in the click volume group sequence, if a first target preset numerical value range exists in a first preset numerical value range set, an average value corresponding to a rear click volume group in the adjacent click volume groups dividing an average value corresponding to a front click volume group and an obtained quotient is greater than a first preset value corresponding to the first target preset numerical value range, and a variance corresponding to the each click volume group in the adjacent click volume groups dividing the corresponding average value and an obtained quotient is greater than a second preset value corresponding to the first target preset numerical value range, the electronic device may determine the last component of the front click volume group as the segmentation point, wherein the first target preset numerical value range is a numerical value range including an absolute value of a difference between the average values respectively corresponding to the adjacent click volume groups, each first preset numerical value range in the first preset numerical value range set having a corresponding first preset value and a second preset value. It needs to be noted that the first preset numerical value range set and the first preset value and second preset value corresponding to each of the first preset numerical value ranges of the first preset numerical value range set may be manually set or may be automatically set by the electronic device, which is not limited in the present embodiment.

In some alternative implementations of the present embodiment, for each formed click volume sequence, the electronic device may further determine each peak value point included in the click volume sequence as a segmentation point directly, and divide the click volume sequence from the segmentation point to obtain the plurality of subsequences of the click volume sequence.

Step 205, determining candidate entries having the categories being a preset category as points of interest to generate a set of points of interest.

In the present embodiment, after determining the category of each candidate entry in the set of candidate entries, the electronic device may determine candidate entries having the categories being a preset category as points of interest to generate a set of points of interest. Here, the preset category may, for example, be a category characterizing that the degree to which the candidate entry is of interest to the user is ascending within the predetermined time period, such as the category "hot."

Alternatively, the electronic device may store the generated set of points of interest, for example, store locally in the electronic device or a server in remote communication with the electronic device.

In some alternative implementations of the present embodiment, the electronic device may further remove a point of interest containing a keyword of a preset keyword set from the set of points of interest to generate a new set of points of interest. Here, the keyword of the preset keyword set may, for example, be a keyword including pornographic contents (for example, name of a porn movie, site name of a pornographic website, or the like). In this way, when the new set of points of interest is used in a scenario such as information push, it is possible to avoid recommending bad information to the user.

Figure 3:
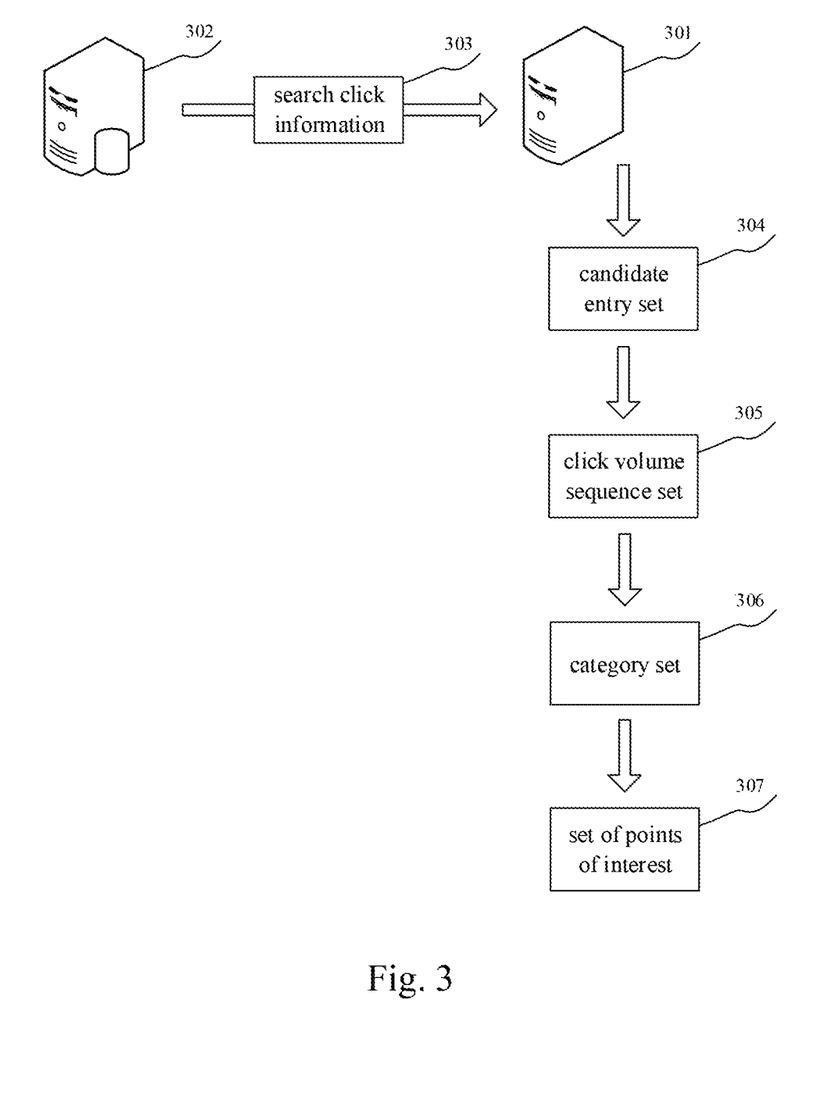
FIG. 3 is a schematic diagram of an application scenario of the artificial intelligence based method for processing information according to the present disclosure.

With further reference to FIG. 3, FIG. 3 is a schematic diagram of an application scenario of the artificial intelligence based method for processing information according to the present embodiment. In the application scenario of FIG. 3, an information processing server 301 may automatically acquire the search click information recorded in the last 30 days before the present day at 9 a.m. every day, wherein the search click information may include entries searched by the user group everyday included in the 30 days and click volumes of the entries on the present day, and the search click information may be prestored in a data storage server 302. Assuming that the present day is June 1, the information processing server 301 may acquire search click information 303 recorded from May 2 to May 31 from the data storage server 302 at June 1, 9 a.m. Then, the information processing server 301 may select, from the search click information 303, entries having click volumes exceeding a click volume threshold on May 31 to generate a candidate entry set 304. Next, for each candidate entry in the candidate entry set 304, the information processing server 301 may form a click volume sequence according to a chronological order of each of the click volumes corresponding to the candidate entry set from May 2 to May 31. Here, the formed click volume sequences may be referred to as a click volume sequence set 305. Then, the information processing server 301 may determine the categories of the candidate entries respectively corresponding to the click volume sequences in the click volume sequence set 305, based on the click volume sequence set 305, here, each of the determined categories may be referred to as a category set 306. Finally, the information processing server 301 may determine candidate entries having the categories being the preset category "hot" in the candidate entry set as the points of interest to generate a set of points of interest 307.

By acquiring search click information recorded within a predetermined time period, to generate a candidate entry set by selecting, from the search click information, entries having click volumes exceeding a click volume threshold within a preset unit time period; then forming, for each candidate entry in the candidate entry set, a click volume sequence according to a chronological order of each of the click volumes corresponding to the candidate entry in the predetermined time period, to determine the categories being used to characterize degrees to which the candidate entries are of interest to a user within the predetermined time period; and finally determining candidate entries having the categories being a preset category as points of interest to generate a set of points of interest, the method provided by the embodiments of the present disclosure thus effectively utilizes the search click information recorded within the predetermined time period and achieves a targeted information processing.

Figure 4:
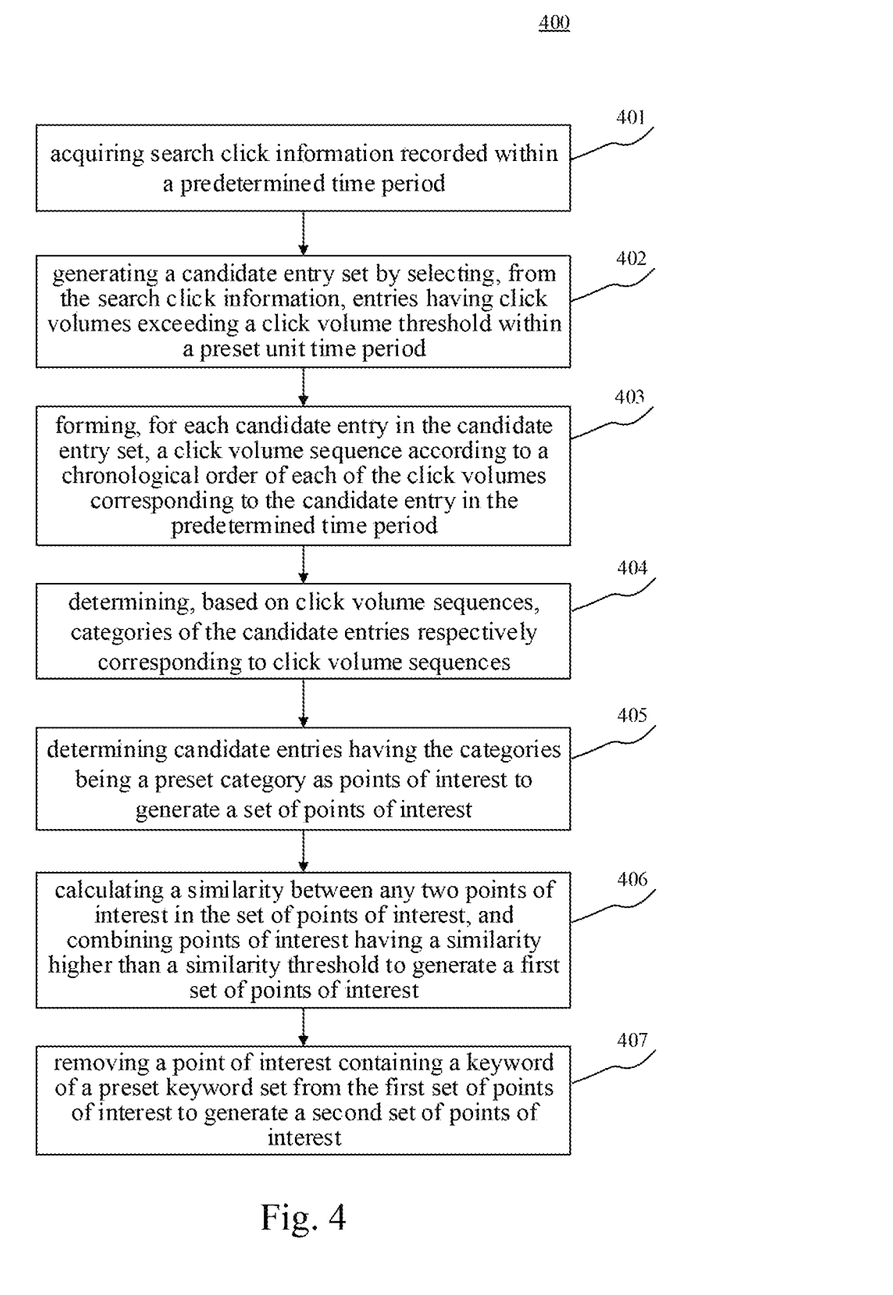
FIG. 4 is a flowchart of another embodiment of the artificial intelligence based method for processing information according to the present disclosure.

With further reference to FIG. 4, a flow 400 of another embodiment of the artificial intelligence based method for processing information is illustrated. The flow 400 of the artificial intelligence based method for processing information includes the following steps:

Step 401, acquiring search click information recorded within a predetermined time period.

In the present embodiment, the electronic device (e.g., the information processing server 101 as shown in FIG. 1) on which the artificial intelligence based method for processing information runs may periodically (for example, every day, every half an hour) acquire search click information recorded within a predetermined time period. Here, the search click information may include entries searched in a unit time period contained in the predetermined time period and click volumes of the entries in the unit time period. Here, for the explanation of step 401, reference may be made to the related description of step 201 in the embodiment shown in FIG. 2, and details description thereof is omitted.

Step 402, generating a candidate entry set by selecting, from the search click information, entries having click volumes exceeding a click volume threshold within a preset unit time period.

In the present embodiment, the electronic device may generate a candidate entry set by selecting, from the acquired search click information, entries having click volumes exceeding a click volume threshold within a preset unit time period. Here, the preset unit time period may be an ending unit time period within the predetermined time period. Here, for the explanation of step 402, reference may be made to the related description of step 202 in the embodiment shown in FIG. 2, and details description thereof is omitted.

Step 403, forming, for each candidate entry in the candidate entry set, a click volume sequence according to a chronological order of each of the click volumes corresponding to the candidate entry in the predetermined time period.

In the present embodiment, after generating the candidate entry set, the electronic device may form a click volume sequence according to a chronological order of each of the click volumes corresponding to each candidate entry in the candidate entry set (the click volume of the candidate entry in a unit time period included in the predetermined time period) in the predetermined time period. Here, for the explanation of step 403, reference may be made to the related description of step 203 in the embodiment shown in FIG. 2, and details description thereof is omitted.

Step 404, determining, based on click volume sequences, categories of the candidate entries respectively corresponding to click volume sequences.

In the present embodiment, after forming the click volume sequence corresponding to each candidate entry in the candidate entry set, the electronic device may determine, based on the click volume sequences, categories of the candidate entries respectively corresponding to the click volume sequences. Here, for the explanation of step 404, reference may be made to the related description of step 204 in the embodiment shown in FIG. 2, and details description thereof is omitted.

Step 405, determining candidate entries having the categories being a preset category as points of interest to generate a set of points of interest.

In the present embodiment, after determining the category of each candidate entry in the set of candidate entries, the electronic device may determine candidate entries having the categories being a preset category as points of interest to generate a set of points of interest. Here, the preset category may, for example, be a category characterizing that the degree to which the candidate entry is of interest to the user is ascending within the predetermined time period, such as the category "hot."

Step 406, calculating a similarity between any two points of interest in the set of points of interest, and combining points of interest having a similarity higher than a similarity threshold to generate a first set of points of interest.

In the present embodiment, the electronic device may calculate the similarity between any two points of interest in the set of points of interest, and combine points of interest having a similarity higher than a similarity threshold to generate a first set of points of interest. Here, the electronic device may calculate the similarity between any two points of interest using, for example, an Edit Distance algorithm. Editing distance, also known as the Levenshtein distance, refers to, between two word strings, the minimum number of times of editing operations required to transfer one string to another. Permissible editing operations include replacing one character with another, inserting a single character, and deleting a single character. Generally speaking, the smaller the edit distance is, the greater the similarity between two strings is. Here, the first set of points of interest includes the uncombined points of interest and the points of interest obtained through the combination in the set of points of interest. Thus, the number of the points of interest may be reduced and the quality of the points of interest may be enhanced by combining the points of interest having a high similarity.

In some alternative implementations of the present embodiment, the electronic device may further lex each point of interest in the set of points of interest and calculate the similarity between any two points of interest in the set of points of interest based on the lexed words. Here, the electronic device may calculate the similarity by using a well-known text similarity calculation method such as the cosine similarity algorithm and the Jaccard coefficient. Taking the Jaccard coefficient method as an example, the electronic device may combine a word set using the words lexed from the each point of interest in the set of points of interest. For two points of interest in the set of points of interest, such as point of interest A and point of interest B, the point of interest A corresponds to a word set A1, the point of interest B corresponds to a word set B1, the similarity between the point of interest A and the point of interest B may be equal to the number of common words between the word set A1 and the word set B1 divided by the total number of words included by the word set A1 or the word set B1.

Step 407, removing a point of interest containing a keyword of a preset keyword set from the first set of points of interest to generate a second set of points of interest.

In the present embodiment, after generating the first set of points of interest, the electronic device may further remove a point of interest containing a keyword of a preset keyword set from the first set of points of interest to generate a second set of points of interest. Here, the keyword of the preset keyword set may, for example, be a keyword including pornographic contents (for example, name of a porn movie, a site name of a pornographic website). In this way, when the new set of points of interest is used in a scenario such as information push, it is possible to avoid recommending bad information to the user. In addition, by removing the point of interest containing a keyword of the preset keyword set from the first set of points of interest, the number of the points of interest may be further reduced and the quality of the points of interest may be enhanced.

As can be seen from FIG. 4, compared with the corresponding embodiment in FIG. 2, the flow 400 of the artificial intelligence based method for processing information in the present embodiment highlights the generation step of the first set of points of interest and the second set of points of interest. Therefore, the solution described by the present embodiment may further reduce the number of the determined points of interest and enhance the quality of the points of interest.

Figure 5:
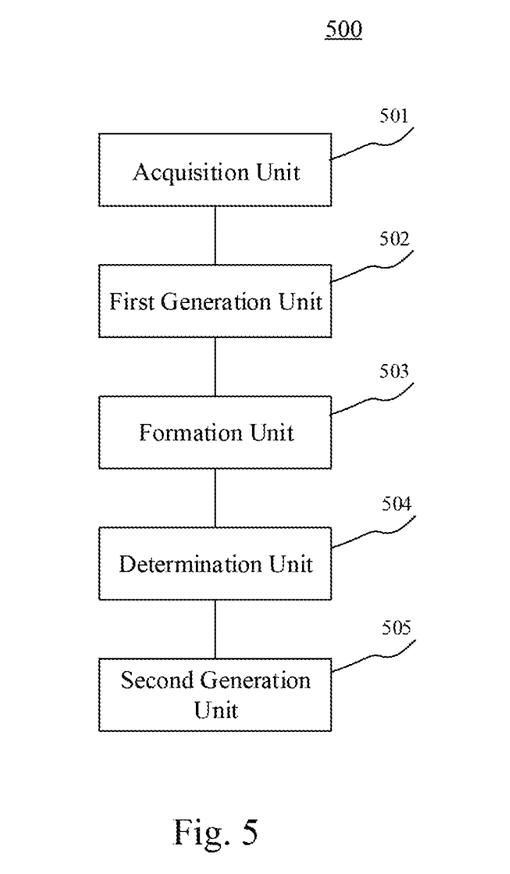
FIG. 5 is a schematic structural diagram of an embodiment of an artificial intelligence based apparatus for processing information according to the present disclosure.

With further reference to FIG. 5, as an implementation to the method shown in the above figures, the present disclosure provides an embodiment of an artificial intelligence based apparatus for processing information. The apparatus embodiment corresponds to the method embodiment shown in FIG. 2, and the apparatus may be specifically applied to various electronic devices.

As shown in FIG. 5, the artificial intelligence based apparatus 500 for processing information illustrated by the present embodiment includes: an acquisition unit 501, a first generation unit 502, a formation unit 503, a determination unit 504 and a second generation unit 505. Here, the acquisition unit 501 is configured for acquiring search click information recorded within a predetermined time period, the search click information including entries searched in a unit time period contained in the predetermined time period and click volumes of the entries in the unit time period; the first generation unit 502 is configured generating a candidate entry set by selecting, from the search click information, entries having click volumes exceeding a click volume threshold within a preset unit time period; the formation unit 503 is configured for forming, for each candidate entry in the candidate entry set, a click volume sequence according to a chronological order of each of the click volumes corresponding to the candidate entry in the predetermined time period; the determination unit 504 is configured for determining, based on click volume sequences, categories of the candidate entries respectively corresponding to click volume sequences, the categories being used to characterize degrees to which the candidate entries are of interest to a user within the predetermined time period; and the second generation unit 505 is configured for determining candidate entries having the categories being a preset category as points of interest to generate a set of points of interest.

In the present embodiment, in the artificial intelligence based apparatus 500 for processing information, the specific processing and the technical effects brought by the acquisition unit 501, the first generation unit 502, the formation unit 503, the determination unit 504 and the second generation unit 505 may respectively refer to the related descriptions of the steps 201, 202, 203, 204 and 205 in the corresponding embodiment in FIG. 2, and detailed description thereof is omitted.

In some alternative implementations of the present embodiment, the determination unit 504 may include: a segmentation subunit (not shown in the figure), configured for segmenting, for each of the click volume sequences, the click volume sequence into a plurality of subsequences, based on a changing trend of the values of the components in the click volume sequence over time; a generation subunit (not shown in the figure), configured for generating trend description information for each subsequence in the plurality of subsequences; and a prediction subunit (not shown in the figure), configured for inputting the plurality of subsequences and the trend description information respectively corresponding to the plurality of subsequences into a pretrained classification model, in order to cause the classification model to predict a category of the candidate entry corresponding to the click volume sequence; wherein the classification model is configured to characterize a correspondence between first information and the category, the first information including the subsequences segmented from the click volume sequence and the trend description information respectively corresponding to the subsequences.

In some alternative implementations of the present embodiment, the segmentation subunit may include: a processing module (not shown in the figure), configured for, for any two adjacent components in the click volume sequence, if a target numerical value range including values of the adjacent components exists in a preset numerical value range set, and an absolute value of a difference between the values of the adjacent components is greater than a threshold corresponding to the target numerical value range, dividing the adjacent components into different subsequences, wherein each preset numerical value range in the preset numerical value range set has a corresponding threshold.

In some alternative implementations of the present embodiment, the segmentation subunit may include: a dividing module (not shown in the figure), configured for dividing the click volume sequence into click volume group sequences, based on the changing trend of the values of the components in the click volume sequence over time; a first determination module (not shown in the figure), configured for determining an average value and a variance of the values of the components in each click volume group in the click volume group sequences; a second determination module (not shown in the figure), configured for determining, a segmentation point in the each click volume group included in the click volume group sequence based on the determined average value and variance; and a segmentation module (not shown in the figure), configured for segmenting the click volume sequence from the determined segmentation points to obtain the plurality of subsequences corresponding to the click volume sequence.

In some alternative implementations of the present embodiment, the dividing module may include: a dividing submodule (not shown in the figure), configured for finding peak value points in the click volume sequence, and dividing the click volume sequence into the click volume group sequences based on the found peak value points, wherein the peak value points are the components having the values in the click volume sequence being greater or smaller than values of both neighboring adjacent components at the same time.

In some alternative implementations of the present embodiment, the second determination module may include: a determining submodule (not shown in the figure), configured for, for any two adjacent click volume groups in the click volume group sequence, if a first target preset numerical value range exists in a first preset numerical value range set, an average value corresponding to a rear click volume group in the adjacent click volume groups dividing an average value corresponding to a front click volume group and an obtained quotient is greater than a first preset value corresponding to the first target preset numerical value range, and a variance corresponding to the each click volume group in the adjacent click volume groups dividing the corresponding average value and an obtained quotient is greater than a second preset value corresponding to the first target preset numerical value range, determining a last component of the front click volume group as the segmentation point, wherein the first target preset numerical value range is a numerical value range including an absolute value of a difference between the average values respectively corresponding to the adjacent click volume groups, each first preset numerical value range in the first preset numerical value range set having a corresponding first preset value and a second preset value.

In some alternative implementations of the present embodiment, the apparatus 500 may further includes: a third generation unit (not shown in the figure), configured for calculating a similarity between any two points of interest in the set of points of interest, and combining points of interest having a similarity higher than a similarity threshold to generate a first set of points of interest.

In some alternative implementations of the present embodiment, the third generation unit may include: a calculation subunit (not shown in the figure), configured for lexing each point of interest in the set of points of interest and calculating the similarity between any two points of interest in the set of points of interest based on the lexed words.

In some alternative implementations of the present embodiment, the apparatus 500 may further includes: a fourth generation unit (not shown in the figure), configured for removing a point of interest containing a keyword of a preset keyword set from the first set of points of interest to generate a second set of points of interest.

By acquiring search click information recorded within a predetermined time period, to generate a candidate entry set by selecting, from the search click information, entries having click volumes exceeding a click volume threshold within a preset unit time period; then forming, for each candidate entry in the candidate entry set, a click volume sequence according to a chronological order of each of the click volumes corresponding to the candidate entry in the predetermined time period, to determine, based on click volume sequences, categories of the candidate entries respectively corresponding to click volume sequences; and finally determining candidate entries having the categories being a preset category as points of interest to generate a set of points of interest, the apparatus provided by the embodiments of the present disclosure thus effectively utilizes the search click information recorded within the predetermined time period and achieves a targeted information processing.

Figure 6:
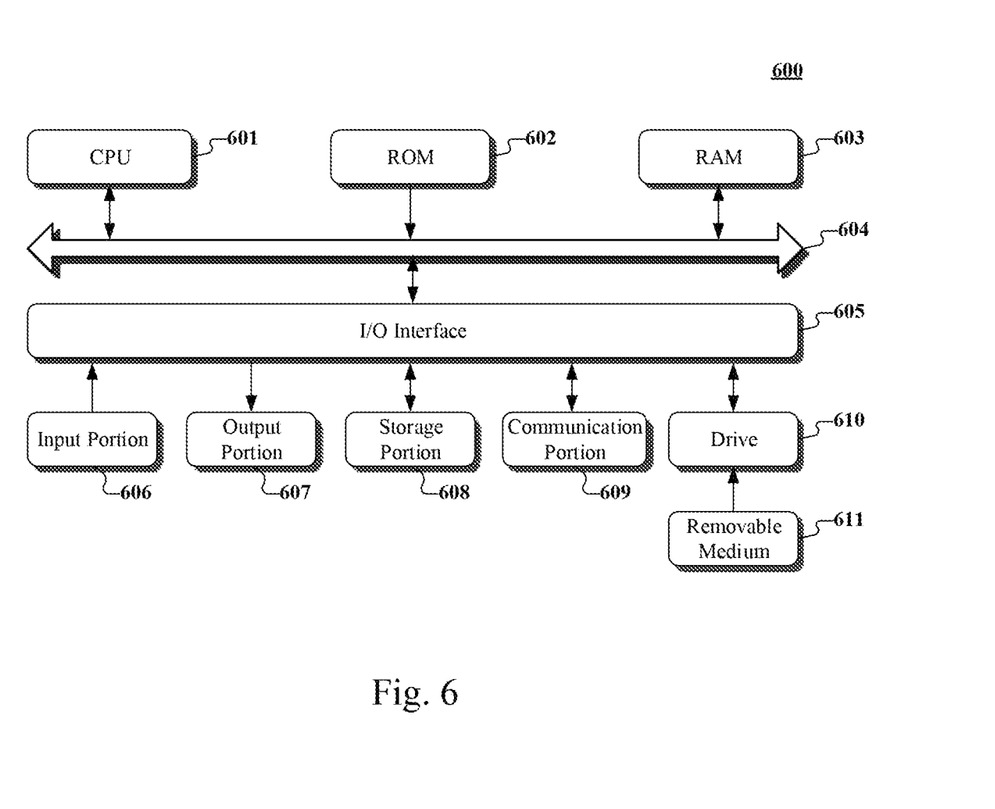
FIG. 6 is a schematic structural diagram of a computer system adapted to implement a server of embodiments of the present disclosure.

With reference to FIG. 6, a schematic structural diagram of a computer system 600 adapted to implement a server of the embodiments of the present disclosure is illustrated. The server shown in FIG. 6 is merely an example and should not impose any restriction on the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, including an acquisition unit, a first generation unit, a formation unit, a determination unit and a second generation unit, where the names of these units or modules do not in some cases constitute a limitation to such units or modules themselves. For example, the acquisition unit may also be described as "a unit for acquiring search click information recorded within a predetermined time period."

In another aspect, the present application further provides a non-volatile computer-readable storage medium. The non-volatile computer-readable storage medium may be the non-volatile computer-readable storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: acquire search click information recorded within a predetermined time period, the search click information including entries searched in a unit time period contained in the predetermined time period and click volumes of the entries in the unit time period; generate a candidate entry set by selecting, from the search click information, entries having click volumes exceeding a click volume threshold within a preset unit time period; form, for each candidate entry in the candidate entry set, a click volume sequence according to a chronological order of each of the click volumes corresponding to the candidate entry in the predetermined time period; determine, based on click volume sequences, categories of the candidate entries respectively corresponding to click volume sequences, the categories being used to characterize degrees to which the candidate entries are of interest to a user within the predetermined time period; and determine candidate entries having the categories being a preset category as points of interest to generate a set of points of interest.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. An artificial intelligence based method for processing information, the method comprising:
  acquiring search click information recorded within a predetermined time period, the search click information comprising entries searched in a unit time period contained in the predetermined time period and click volumes of the entries in the unit time period;

generating a candidate entry set by selecting, from the search click information, entries having click volumes exceeding a click volume threshold within a preset unit time period;

forming, for each candidate entry in the candidate entry set, a click volume sequence according to a chronological order of each of the click volumes corresponding to the candidate entry in the predetermined time period;

determining, based on click volume sequences, categories of the candidate entries respectively corresponding to click volume sequences, the categories being used to characterize degrees to which the candidate entries are of interest to a user within the predetermined time period; and determining candidate entries having the categories being a preset category as points of interest to generate a set of points of interest, wherein the determining, based on click volume sequences, categories of the candidate entries respectively corresponding to click volume sequences comprises:

segmenting, for each of the click volume sequences, the click volume sequence into a plurality of subsequences, based on a changing trend of the values of the components in the click volume sequence over time, the segmenting being performed by: dividing the click volume sequence into click volume group sequences, based on the changing trend of the values of the components in the click volume sequence over time; determining an average value and a variance of the values of the components in each click volume group in the click volume group sequences; determining, a segmentation point in the each click volume group included in the click volume group sequence based on the determined average value and variance; and segmenting the click volume sequence from the determined segmentation points to obtain the plurality of subsequences corresponding to the click volume sequence; and generating trend description information for each subsequence in the plurality of subsequences, for determining the categories of the candidate entries respectively corresponding to click volume sequences based on the plurality of subsequences and the trend description information for each subsequence in the plurality of subsequences.

2. The method according to claim 1, wherein the determining the categories of the candidate entries respectively corresponding to click volume sequences based on the plurality of subsequences and the trend description information for each subsequence in the plurality of subsequences comprises:

inputting the plurality of subsequences and the trend description information respectively corresponding to the plurality of subsequences into a pre-trained classification model, in order to cause the classification model to predict a category of the candidate entry corresponding to the click volume sequence;

wherein the classification model is configured to characterize a correspondence between first information and the category, the first information comprising the subsequences segmented from the click volume sequence and the trend description information respectively corresponding to the subsequences.

3. The method according to claim 2, wherein the segmenting, for each of the click volume sequences, the click volume sequence into a plurality of subsequences, based on a changing trend of the values of the components in the click volume sequence over time further comprises:

for any two adjacent components in the click volume sequence, if a target numerical value range including values of the adjacent components exists in a preset numerical value range set, and an absolute value of a difference between the values of the adjacent components is greater than a threshold corresponding to the target numerical value range, dividing the adjacent components into different subsequences, wherein each preset numerical value range in the preset numerical value range set has a corresponding threshold.

4. The method according to claim 1, wherein the dividing the click volume sequence into click volume group sequences, based on the changing trend of the values of the components in the click volume sequence over time comprises: finding peak value points in the click volume sequence, and dividing the click volume sequence into the click volume group sequences based on the found peak value points, wherein the peak value points are the components having the values in the click volume sequence being greater or smaller than values of both neighboring adjacent components at the same time.

5. The method according to claim 1, wherein the determining, a segmentation point in the each click volume group included in the click volume group sequence based on the determined average value and variance comprises: for any two adjacent click volume groups in the click volume group sequence, if a first target preset numerical value range exists in a first preset numerical value range set, an average value corresponding to a rear click volume group in the adjacent click volume groups dividing an average value corresponding to a front click volume group and an obtained quotient is greater than a first preset value corresponding to the first target preset numerical value range, and a variance corresponding to the each click volume group in the adjacent click volume groups dividing the corresponding average value and an obtained quotient is greater than a second preset value corresponding to the first target preset numerical value range, determining a last component of the front click volume group as the segmentation point, wherein the first target preset numerical value range is a numerical value range including an absolute value of a difference between the average values respectively corresponding to the adjacent click volume groups, each first preset numerical value range in the first preset numerical value range set having a corresponding first preset value and a second preset value.

6. The method according to claim 1, wherein the method further comprises:

calculating a similarity between any two points of interest in the set of points of interest, and combining points of interest having a similarity higher than a similarity threshold to generate a first set of points of interest.

7. The method according to claim 6, wherein the calculating a similarity between any two points of interest in the set of points of interest comprises:

lexing each point of interest in the set of points of interest and calculating the similarity between any two points of interest in the set of points of interest based on the lexed words.

8. The method according to claim 6, wherein the method further comprises:

removing a point of interest containing a keyword of a preset keyword set from the first set of points of interest to generate a second set of points of interest.

9. An artificial intelligence based apparatus for processing information, the apparatus comprising:
- at least one processor; and
- a memory storing instructions, the instructions when executed by the at least one processor, cause the at least one processor to perform operations, the operations comprising:
- acquiring search click information recorded within a predetermined time period, the search click information comprising entries searched in a unit time period contained in the predetermined time period and click volumes of the entries in the unit time period;
- generating a candidate entry set by selecting, from the search click information, entries having click volumes exceeding a click volume threshold within a preset unit time period;
- forming, for each candidate entry in the candidate entry set, a click volume sequence according to a chronological order of each of the click volumes corresponding to the candidate entry in the predetermined time period;
- determining, based on click volume sequences, categories of the candidate entries respectively corresponding to click volume sequences, the categories being used to characterize degrees to which the candidate entries are of interest to a user within the predetermined time period; and
- determining candidate entries having the categories being a preset category as points of interest to generate a set of points of interest,
- wherein the determining, based on click volume sequences, categories of the candidate entries respectively corresponding to click volume sequences comprises:
- segmenting, for each of the click volume sequences, the click volume sequence into a plurality of subsequences, based on a changing trend of the values of the components in the click volume sequence over time, the segmenting being performed by: dividing the click volume sequence into click volume group sequences, based on the changing trend of the values of the components in the click volume sequence over time; determining an average value and a variance of the values of the components in each click volume group in the click volume group sequences; determining, a segmentation point in the each click volume group included in the click volume group sequence based on the determined average value and variance; and segmenting the click volume sequence from the determined segmentation points to obtain the plurality of subsequences corresponding to the click volume sequence; and
- generating trend description information for each subsequence in the plurality of subsequences, for determining the categories of the candidate entries respectively corresponding to click volume sequences based on the plurality of subsequences and the trend description information for each subsequence in the plurality of subsequences.

10. The apparatus according to claim 9, wherein the determining the categories of the candidate entries respectively corresponding to click volume sequences based on the plurality of subsequences and the trend description information for each subsequence in the plurality of subsequences comprises:
- inputting the plurality of subsequences and the trend description information respectively corresponding to the plurality of subsequences into a pre-trained classification model, in order to cause the classification model to predict a category of the candidate entry corresponding to the click volume sequence;
- wherein the classification model is configured to characterize a correspondence between first information and the category, the first information comprising the subsequences segmented from the click volume sequence and the trend description information respectively corresponding to the subsequences.

11. The apparatus according to claim 10, wherein the segmenting, for each of the click volume sequences, the click volume sequence into a plurality of subsequences, based on a changing trend of the values of the components in the click volume sequence over time further comprises:
- for any two adjacent components in the click volume sequence, if a target numerical value range including values of the adjacent components exists in a preset numerical value range set, and an absolute value of a difference between the values of the adjacent components is greater than a threshold corresponding to the target numerical value range, dividing the adjacent components into different subsequences, wherein each preset numerical value range in the preset numerical value range set has a corresponding threshold.

12. The apparatus according to claim 9, wherein the dividing the click volume sequence into click volume group sequences, based on the changing trend of the values of the components in the click volume sequence over time comprises: finding peak value points in the click volume sequence, and dividing the click volume sequence into the click volume group sequences based on the found peak value points, wherein the peak value points are the components having the values in the click volume sequence being greater or smaller than values of both neighboring adjacent components at the same time.

13. The apparatus according to claim 9, wherein the determining, a segmentation point in the each click volume group included in the click volume group sequence based on the determined average value and variance comprises: for any two adjacent click volume groups in the click volume group sequence, if a first target preset numerical value range exists in a first preset numerical value range set, an average value corresponding to a rear click volume group in the adjacent click volume groups dividing an average value corresponding to a front click volume group and an obtained quotient is greater than a first preset value corresponding to the first target preset numerical value range, and a variance corresponding to the each click volume group in the adjacent click volume groups dividing the corresponding average value and an obtained quotient is greater than a second preset value corresponding to the first target preset numerical value range, determining a last component of the front click volume group as the segmentation point, wherein the first target preset numerical value range is a numerical value range including an absolute value of a difference between the average values respectively corresponding to the adjacent click volume groups, each first preset numerical value range in the first preset numerical value range set having a corresponding first preset value and a second preset value.

14. The apparatus according to claim 9, wherein the operations further comprise:
- calculating a similarity between any two points of interest in the set of points of interest, and combining points of interest having a similarity higher than a similarity threshold to generate a first set of points of interest.

15. The apparatus according to claim 14, wherein the calculating a similarity between any two points of interest in the set of points of interest comprises:

lexing each point of interest in the set of points of interest and calculating the similarity between any two points of interest in the set of points of interest based on the lexed words.

16. The apparatus according to claim 14, wherein the operations further comprise:

removing a point of interest containing a keyword of a preset keyword set from the first set of points of interest to generate a second set of points of interest.

17. A non-transitory computer storage medium storing a computer program, the computer program when executed by one or more processors, causes the one or more processors to perform operations, the operations comprising:

acquiring search click information recorded within a predetermined time period, the search click information comprising entries searched in a unit time period contained in the predetermined time period and click volumes of the entries in the unit time period;

generating a candidate entry set by selecting, from the search click information, entries having click volumes exceeding a click volume threshold within a preset unit time period;

forming, for each candidate entry in the candidate entry set, a click volume sequence according to a chronological order of each of the click volumes corresponding to the candidate entry in the predetermined time period;

determining, based on click volume sequences, categories of the candidate entries respectively corresponding to click volume sequences, the categories being used to characterize degrees to which the candidate entries are of interest to a user within the predetermined time period; and determining candidate entries having the categories being a preset category as points of interest to generate a set of points of interest, wherein the determining, based on click volume sequences, categories of the candidate entries respectively corresponding to click volume sequences comprises:

segmenting, for each of the click volume sequences, the click volume sequence into a plurality of subsequences, based on a changing trend of the values of the components in the click volume sequence over time, the segmenting being performed by: dividing the click volume sequence into click volume group sequences, based on the changing trend of the values of the components in the click volume sequence over time; determining an average value and a variance of the values of the components in each click volume group in the click volume group sequences; determining, a segmentation point in the each click volume group included in the click volume group sequence based on the determined average value and variance; and segmenting the click volume sequence from the determined segmentation points to obtain the plurality of subsequences corresponding to the click volume sequence; and generating trend description information for each subsequence in the plurality of subsequences, for determining the categories of the candidate entries respectively corresponding to click volume sequences based on the plurality of subsequences and the trend description information for each subsequence in the plurality of subsequences.

* * * * *